Oct. 20, 1925.
A. E. PEARSON
1,557,723
MEANS FOR MAKING INLAID CEMENT BLOCKS
Filed Sept. 7, 1922
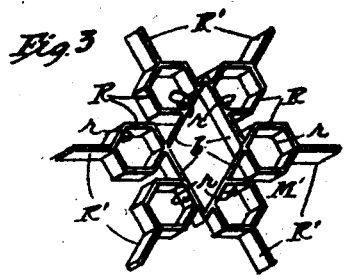
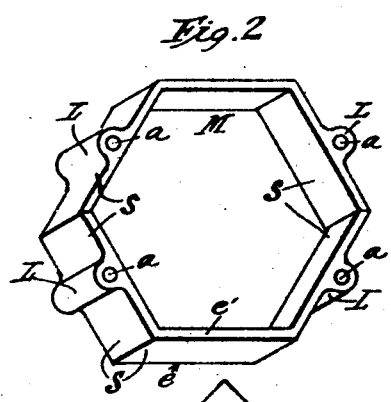
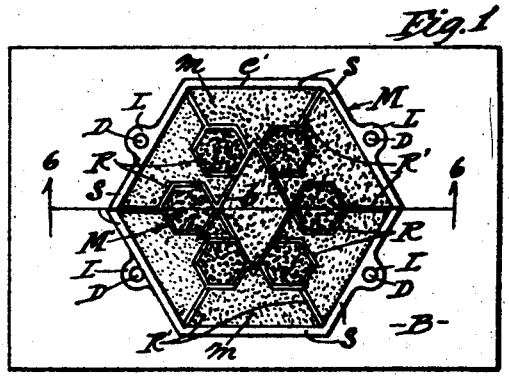
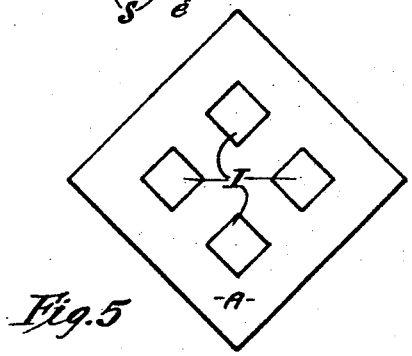
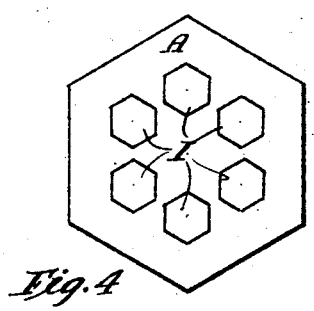
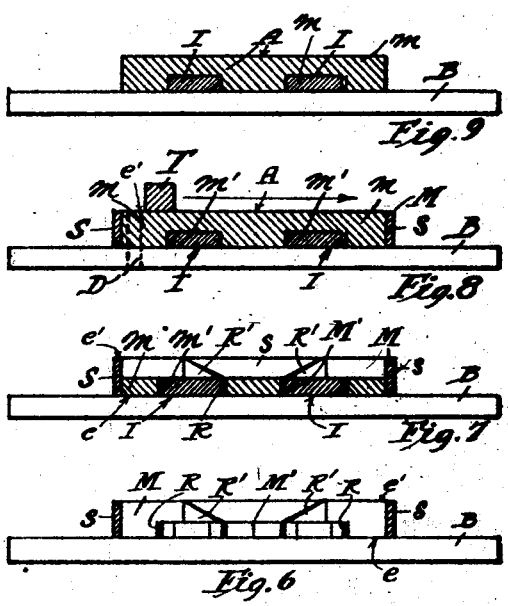
INVENTOR.
Arthur E. Pearson
BY
ATTORNEYS.

Patented Oct. 20, 1925.

1,557,723

UNITED STATES PATENT OFFICE.

ARTHUR E. PEARSON, OF LOS ANGELES, CALIFORNIA.

MEANS FOR MAKING INLAID CEMENT BLOCKS.

Application filed September 7, 1922. Serial No. 586,557.

*To all whom it may concern:*

Be it known that I, ARTHUR E. PEARSON, a citizen of the United States, and a resident of Los Angeles, in the county of Los Angeles and State of California, have invented new and useful Improvements in Means for Making Inlaid Cement Blocks, of which the following is a specification.

This invention relates to and has for a main object the provision of means for moulding inlaid cement blocks such as are adapted to be used for floors, walls and the like.

Another object is to provide a simple and effective mould embodying separate mould members for the body of the block and for the inlay, capable of arrangement in suitable geometric or ornamental designs whereby the blocks when moulded set and hardened may be laid edge to edge, providing ornamental floors for buildings and for other purposes.

Another purpose is to provide a separable mould of simple design embodying a base having a smooth moulding surface, a body mould positioned on the base, and an inlay mould removably held within the body mould and also positioned on the base whereby the material forming the body of the block may be poured into the body mould around the inlay mould, and the material forming the inlays may be poured into the inlay mould, after which the inlay mould is adapted to be removed so that the material forming the body in the inlays will unite while still in a plastic state, thus providing a cement block having inlays of a different color from the body and of any suitable geometric or ornamental design, which when moulded on the smooth surface of the base will provide a uniform surface, and the inlays being deep set in the body will not be defaced or removed by use.

Another object is to provide means for forming inlaid cement blocks embodying the use of separate moulds for the inlay and the body of the blocks, and a base on which the moulds are adapted to be held during the moulding operation, the inlay mould being shallower than the body mould and removably held therein.

The material of which the body is formed is poured into the body mould around the recesses of the inlay mould as a first step in the operation, to the level of the upper edge of the inlay mould, thereafter the recesses of the inlay mould are filled with the inlay material and the unfilled portion of the body mould is then filled with the body material for covering the inlays, and a suitable tool is moved over the upper edge of the body mould for smoothing the upper surface of the block thus formed, which surface constitutes the bottom of a block when completed. The inlay block is withdrawn from the body mould prior to the filling of the body mould, and the body mould may be withdrawn as soon as the block has set sufficiently.

Other objects may appear as the description progresses.

I have illustrated a preferred embodiment of my invention in the accompanying drawings, in which:

Fig. 1 is a plan view of a mould suitable for use in carrying out my improved method of forming inlay cement blocks.

Fig. 2 is a perspective view of a body mould.

Fig. 3 is a perspective view of the inlay mould.

Fig. 4 is a plan of a cement block formed in the mould.

Fig. 5 is a view of another form of block formed thereby.

Fig. 6 is a sectional view of the mould prior to the beginning of a block forming operation and showing the first step in the process.

Fig. 7 is a similar section of the same showing the second step in the process.

Fig. 8 is a similar section showing the third step in the process; and

Fig. 9 is a similar section showing the final step in the process.

Now, it will be understood that while I have shown only one embodiment of my invention and one form of mould, that the means shown is susceptible to change and modification within the scope of the appended claim without departing from the spirit of my invention.

The invention however, as shown includes a moulding device embodying a body mould M of any suitable form and corresponding to the form of block to be made thereby, an inlay mould M' including a plurality of geometric or ornamentally formed and arranged recesses and adapted to be supported within the body mould, and a base B having a smooth moulding surface on the upper side thereof for receiving and holding the moulds M and M' in position for use.

The body mould M may be of any geometric form such as square, round, hexagonal, octagonal or otherwise, and is preferably formed of two mating sections as indicated in Figs. 1 and 2. The form of mould shown is of hexagonal character and is formed of six side portions, four of which portions are provided with lugs having bores therethrough for receiving dowels removably held in the base B so as to position the mould M on said base. The mould M has a central recess formed between the sides and the lower edge e thereof is adapted to rest upon the upper surface of base B when in position for use.

The inlay mould M' has a plurality of inlay recesses r which in the form of device shown are formed by means of hexagonal ribs, uniformly arranged about a common axis, and each of said ribs has radially formed extensions R', R' projecting outwardly therefrom and adapted to seat in the angles of the sides of the mould M, as clearly shown in Fig. 1, so that the mould M' will at all times be centered in the mould M.

The mould M' is substantially narrower than the mould M and corresponds in height to the thickness of the inlay which may be greater or less than shown. The height of the mould M corresponds to the thickness of the cement block formed thereby, and substantially to the thickness of a floor, but this is immaterial to my invention.

Thus, it will be seen that the edges of the mould M are separably held together so that when the dowels D are removed from the base, the two halves may be drawn outwardly from the block A, also, the mould M' may be arranged as shown or otherwise, for the purpose of centering the same within the mold M, the character of the recesses R and ribs R' or their equivalents being such that the said ribs may be readily grasped by the hand for removing the mould M' bodily from the plastic material which is poured therein and therearound, as shown in Fig. 1.

Of course, it will be understood that in some cases the mould M and the recesses R of the mould M' may be circular or of other geometric, fanciful or ornamental form, but it is essential that the ribs R' and also the ribs R forming the recesses r should be of minimum thickness so that when the mould M' is withdrawn from the plastic material the spaces left by the said ribs will be rapidly and completely filled by the settling of the plastic material therein.

Referring particularly to Figs. 6 to 9 inclusive, it will be observed that in carrying out my improved method for making inlaid cement blocks by means of the mould shown and described, the lower edge e of the mould M is first positioned on the upper surface of the base B, as shown in Fig. 6, and the dowels D are inserted in the apertures a of lugs L for holding the mould in position on the base. Thereafter the mould M' is positioned within the mould M and is centered therein by means of the ribs R' which engage the angles of the sides of mould M.

Inasmuch as the mould M' is of lesser height than the mould M and the lower edge of mould M' rests upon the base B on which the mould M is mounted, it will be noted that the height of the mould M' defines the depth of the inlays on the blocks A, while the portion of the mould M above the upper edge of mould M' determines the thickness of the block opposite the inlays.

Now, when the moulds M and M' are positioned as shown and described, the plastic material m composed of cement, sand, water and possibly other substances which are usually employed in the manufacture of artificial stone and cement work, is poured into the mould M around the recess r of the mould M', thus filling all of the spaces including the central space b, with the exception of the recesses r. Thereupon the inlay material m' also of similar nature except that it may be colored as desired, is poured into the recesses r of the mold M', the material m and m' being poured into the mould until a common level flush with the upper edge of the mould M' is attained. Thereafter the upper portion of the mould above the mould M' is filled with the plastic material m as shown in Fig. 8, and forms a back for the inlays I.

Of course, this method may be also carried out by first filling the inlay recesses r with the material m' and thereafter filling the remaining portion of the mould M with the body material m to the level of the upper edge e' of mould M.

When a sufficient quantity of the materials m and m' have been poured into the mould, the upper side of the block A thus formed may be smoothed by means of a tool T adapted to be moved in a horizontal path over the upper edge e' of the mould M. As a final step in the operation, after the material is set the two halves of the mould M may be withdrawn laterally from the block A when the dowels D are removed from the lug L, and the block A may be then displaced from the base B for further disposition.

Having thus described my invention, what I claim and desire to secure by Letters Patent is:

A moulding device for inlaid cement blocks comprising a flat base for moulding the face of the blocks, a body mould composed of separable mating sections and having vertically disposed moulding faces on the inner sides thereof, and an inlay mould having vertical partitions removably held within said body mould whereby plastic inlays may be formed within the body of the blocks formed in said body mould, one of the edges of the inlay mould being flush with one of the edges of said body mould, and said inlay mould being of lesser depth than said body mould for providing a substantial backing of plastic material thereabove.

ARTHUR E. PEARSON.